United States Patent
Gamage (10) Patent No.: US 9,518,209 B2
(45) Date of Patent: Dec. 13, 2016

(54) SOLIDS FREE GELLABLE TREATMENT FLUIDS

(71) Applicant: HALLIBURTON ENERGY SERVICES, INC., Houston, TX (US)

(72) Inventor: Pubudu H Gamage, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/891,605

(22) PCT Filed: Sep. 3, 2013

(86) PCT No.: PCT/US2013/057848
§ 371 (c)(1),
(2) Date: Nov. 16, 2015

(87) PCT Pub. No.: WO2015/034466
PCT Pub. Date: Mar. 12, 2015

(65) Prior Publication Data
US 2016/0083641 A1 Mar. 24, 2016

(51) Int. Cl.
| | |
|---|---|
| C09K 8/42 | (2006.01) |
| E21B 43/16 | (2006.01) |
| E21B 21/06 | (2006.01) |
| C09K 8/08 | (2006.01) |
| C09K 8/20 | (2006.01) |

(Continued)

(52) U.S. Cl.
CPC ............. *C09K 8/426* (2013.01); *C09K 8/08* (2013.01); *C09K 8/20* (2013.01); *C09K 8/512* (2013.01); *C09K 8/514* (2013.01); *C09K 8/5756* (2013.01); *C09K 8/5758* (2013.01); *C09K 8/685* (2013.01); *C09K 8/725* (2013.01); *C09K 8/887* (2013.01); *C09K 8/905* (2013.01); *E21B 21/062* (2013.01); *E21B 43/16* (2013.01)

(58) Field of Classification Search
None
See application file for complete search history.

(56) References Cited

U.S. PATENT DOCUMENTS

| | | |
|---|---|---|
| 4,555,269 A | 11/1985 | Rao et al. |
| 4,609,476 A | 9/1986 | Heilweil |

(Continued)

FOREIGN PATENT DOCUMENTS

| | | |
|---|---|---|
| WO | 2009097286 A1 | 8/2009 |
| WO | 2010044059 A1 | 4/2010 |

OTHER PUBLICATIONS

BASF Corporation, Safety Data Sheet FDP-C1055-12, Revision date: Jun. 20, 2011, Version 1.2, p. 1-7.

(Continued)

*Primary Examiner* — Jeffrey Washville
(74) *Attorney, Agent, or Firm* — McAfee & Taft A Professional Corporation (57) ABSTRACT

Gellable treatment fluids containing an amps-acrylamide bipolymer and a suitable surfactant can be used in various subterranean operations where it is necessary for the treatment fluid to remain in a gelled state for extended periods of time at high formation temperatures. The gellable treatment fluids are thermally-stable, solids-free self-degrading treatment fluid compositions useful in fluid loss pill, kill pill, perforation pill and other gel treatment applications.

16 Claims, 1 Drawing Sheet (51) Int. Cl.
*C09K 8/512* (2006.01)
*C09K 8/514* (2006.01)
*C09K 8/575* (2006.01)
*C09K 8/68* (2006.01)
*C09K 8/72* (2006.01)
*C09K 8/88* (2006.01)
*C09K 8/90* (2006.01)

(56) References Cited

U.S. PATENT DOCUMENTS

| | | |
|---|---|---|
| 6,986,391 B2 | 1/2006 | Funkhouser et al. |
| 7,407,008 B2 | 8/2008 | Benton |
| 8,450,252 B2 | 5/2013 | Funkhouser et al. |
| 2012/0058922 A1* | 3/2012 | Favero ............... C08K 5/005 507/226 |
| 2012/0118569 A1 | 5/2012 | Deville |
| 2012/0208727 A1 | 8/2012 | Funkhouser et al. |
| 2013/0118740 A1 | 5/2013 | Sherman et al. |
| 2013/0118744 A1* | 5/2013 | Gamage ............... E21B 33/13 166/293 |

OTHER PUBLICATIONS

Vollmer, Daniel P., and Alleman, David J., HEC No Longer the Preferred Polymer, SPE 65398, Society of Petroleum Engineers, presented at the 2001 SPE International Symposium on Oilfield Chemistry in Houston, TX, Feb. 13-16, 2001.

Prada, Alvaro, Civan, Faruk and Dalrymple, E. Dwyann, Evaluation of Gelation Systems for Conformance Control, SPE 59322, Society of Petroleum Engineers, presented at the 2000 SPE/DOE Improved Oil Recovery Symposium held in Tulsa, Oklahoma Apr. 3-5, and 2000 SPE Permian Basin Oil and Gas Recovery Conference, Midland, Texas, Mar. 21-23.

Funkhouser, Gary P. and Norman, Lewis R., Synthetic Polymer Fracturing Fluid for High-Temperature Applications, SPE 80236, Society of Petroleum Engineers, presented at the SPE International Symposium on Oilfield Chemistry held in Houston, Texas, Feb. 5-7, 2003.

International Search Report and Written Opinion mailed Jun. 17, 2014 in corresponding application PCT/US13/057848, Halliburton Energy Services, Inc.

Moradi-Araghi, A. A., Review of thermally stable gels for fluid diversion in petroleum production, Journal of Petroleum Science and Engineering, 2000, vol. 26, No. 1, pp. 1-10 (Abstract).

Hirasaki, George J., Miller, Clarence A. and Puerto, Maura, Recent Advances in Surfactant EOR, SPE 115386, Society of Petroleum Engineers, presented at the SPE Annual Technical Conference and Exhibition, Denver, Colorado, Sep. 21-24, 2008.

Baradril-N Acid Soluble Drill-in Fluids, product data sheet, Halliburton Baroid 2012.
Barascav-D, Product Data Sheet, Halliburton, 2010.
Baroid Formula Sheet CFS-559, Halliburton, 2013.
Baroid Formula Sheet CFS-485, Halliburton, 2013.
Baroid Forumla Sheet CFS-592, Halliburton, 2012.
Baroid Formula Sheet, CFS-563, Halliburton, 2012.
Baroid Formula Sheet, CFS-594, Halliburton, 2013.

* cited by examiner

SOLIDS FREE GELLABLE TREATMENT FLUIDS

CROSS RELATED

This application claims the benefit of previously filed International Application PCT/US2013/057848 filed Sep. 3, 2013.

FIELD

The present disclosure generally relates to the use of gellable treatment fluids in subterranean operations, and, more specifically, to the use of gellable treatment fluids that can remain in a gelled state for an extended period of time at high formation temperatures.

BACKGROUND

Treatment fluids can be employed in a variety of subterranean operations. As used herein the terms "treatment," "treating," and grammatical equivalents thereof refer to any subterranean operation that uses a fluid in conjunction with performing a desired function and/or for achieving a desired purpose. Illustrative subterranean operations that can be performed using treatment fluids can include, for example, drilling operations, fracturing operations, sand control operations, gravel packing operations, acidizing operations, conformance control operations, fluid diversion operations, fluid blocking operations, and the like.

In many cases, treatment fluids can be utilized in a gelled state when performing a treatment operation. For example, in a fracturing operation, a treatment fluid can be gelled to increase its viscosity and improve its ability to carry a proppant or other particulate material. In other cases, a treatment fluid can be used to temporarily divert or block the flow of fluids within at least a portion of a subterranean formation. In the case of fracturing operations, the treatment fluid typically spends only a very short amount of time downhole before the gel is broken and the treatment fluid is produced from the wellbore. In fluid diversion or blocking operations, often the gel needs to remain in place only for a short amount of time while another treatment fluid is flowed elsewhere in the subterranean formation; however, it can sometimes become necessary to block the flow of fluids in the subterranean formation for a prolonged period of time, typically for at least about one day or more. In some cases, the period of time can be one to five days. In other cases, the period of time can be much longer, such as weeks. For example, it can sometimes be desirable to impede the flow of formation fluids for extended periods of time by introducing a kill pill or perforation pill into the subterranean formation to at least temporarily cease production. As used herein, the terms "kill pill" and "perforation pill" refer to a small amount of a treatment fluid introduced into a wellbore that blocks the ability of formation fluids to flow into the wellbore. Likewise, in fluid loss applications, it can sometimes be desirable to form a barrier within the wellbore that persists for an extended period of time. In fluid loss applications a fluid loss pill is introduced in the wellbore to impede the flow of fluids into the formation from the wellbore. In fluid loss pill, kill pill and perforation pill applications, high density brines can be particularly effective as a carrier fluid, since they can be formulated to form a highly viscous gel that blocks the flow of fluids within the wellbore by exerting hydrostatic pressure therein.

Treatment fluids typically remain in a stable gelled state only for a finite period of time before they break into lower viscosity fluids. In many cases, the decomposition of a gel can be accelerated by using a breaker, if a faster break is desired. For subterranean operations requiring extended downhole residence times, many treatment fluids can prove unsuitable since they can break before their intended downhole function is completed. The premature break of treatment fluids can be particularly problematic in high temperature subterranean formations (e.g., formations having a temperature of about 200° F. or above) where the elevated formation temperature decreases the gel stability and speeds gel decomposition. As subterranean operations are being conducted in deeper wellbores having ever higher formation temperatures, the issues with long-term gel stability are becoming increasingly encountered as existing gels are being pushed to their chemical and thermal stability limits. Premature breaking can be particularly problematic in high temperature applications of biopolymer-based gellable treatment fluids (e.g., guar- and cellulose-based treatment fluids and the like), where thermally induced chain scission and molecular weight loss can accelerate gel breaking.

Synthetic gellable polymers having increased thermal stability have sometimes been used in place of biopolymers to extend the working temperature range of gellable treatment fluids. One issue with synthetic gellable polymers is that they can sometimes become crosslinked too rapidly or become overly crosslinked during gelling. If crosslinking occurs too rapidly, downhole introduction of the gellable treatment fluids can be complicated due to high friction pressures as the gel becomes too thick to effectively pump before reaching its intended location. If the gel becomes overly crosslinked, the gel can be too viscous, difficult to break and sometimes exhibit excessive syneresis whereby carrier fluid is exuded from the gel.

As can be appreciated from the above, a treatment fluid composition suitable for a particular downhole use and particular formation conditions will not necessarily be suitable for different downhole uses and/or different formation conditions; thus, there are numerous problems and considerations in developing an appropriate treatment fluid composition to be used in fluid loss pill, kill pill and perforation pill applications.

DETAILED DESCRIPTION

The exemplary treatment fluid composition disclosed herein may directly or indirectly affect one or more components or pieces of equipment associated with the preparation, delivery, recapture, recycling, reuse, and/or disposal of the disclosed treatment fluid composition. For example, and with reference to FIG. 1, the disclosed treatment fluid composition may directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

Figure 1:
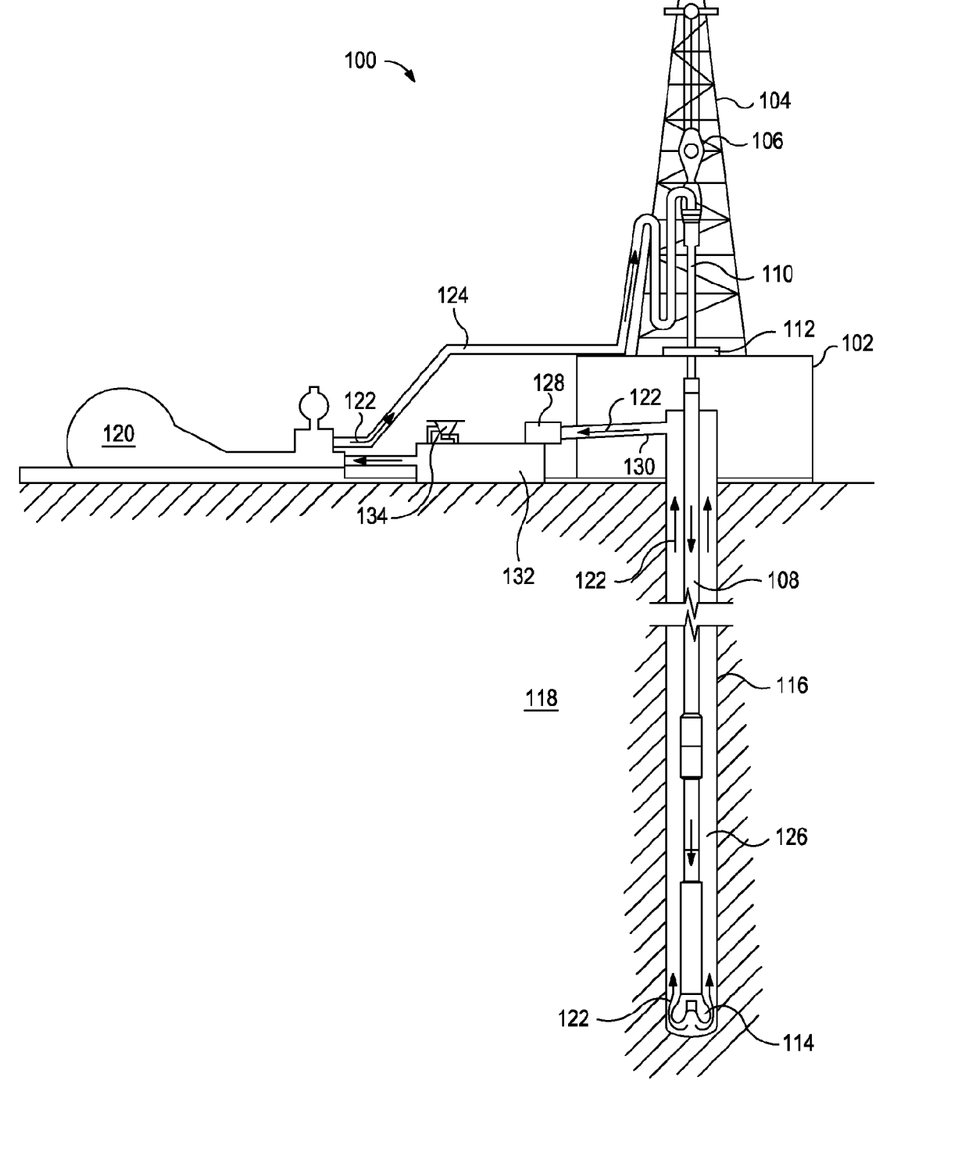
FIG. 1 is a schematic illustration generally depicting a land-based drilling assembly.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the borehole 116 via the annulus 126, those skilled in the art will readily appreciate that the fluid processing unit(s) 128 may be arranged at any other location in the drilling assembly 100 to facilitate its proper function, without departing from the scope of the disclosure.

One or more of the disclosed treatment fluid compositions may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the disclosed treatment fluid composition may be added to the drilling fluid 122 at any other location in the drilling assembly 100. In at least one embodiment, for example, there could be more than one retention pit 132, such as multiple retention pits 132 in series. Moreover, the retention pit 132 may be representative of one or more fluid storage facilities and/or units where the disclosed treatment fluid composition may be stored, reconditioned, and/or regulated until added to the drilling fluid 122.

As mentioned above, the disclosed treatment fluid composition may directly or indirectly affect the components and equipment of the drilling assembly 100. For example, the disclosed treatment fluid composition may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a filter (e.g., diatomaceous earth filters), a heat exchanger, and any fluid reclamation equipment. The fluid processing unit(s) 128 may further include one or more sensors, gauges, pumps, compressors, and the like used to store, monitor, regulate, and/or recondition the exemplary treatment fluid composition(s).

The disclosed treatment fluid composition may directly or indirectly affect the pump 120, which representatively includes any conduits, pipelines, trucks, tubulars, and/or pipes used to fluidically convey the treatment fluid composition downhole, any pumps, compressors, or motors (e.g., topside or downhole) used to drive the treatment fluid composition into motion, any valves or related joints used to regulate the pressure or flow rate of the treatment fluid composition, and any sensors (i.e., pressure, temperature, flow rate, etc.), gauges, and/or combinations thereof, and the like. The disclosed treatment fluid composition may also directly or indirectly affect the mixing hopper 134 and the retention pit 132 and their assorted variations.

The disclosed treatment fluid composition may also directly or indirectly affect the various downhole equipment and tools that may come into contact with the treatment fluid composition such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed treatment fluid composition may also directly or indirectly affect any downhole heat exchangers, valves and corresponding actuation devices, tool seals, packers and other wellbore isolation devices or components, and the like associated with the wellbore 116. The disclosed treatment fluid composition may also directly or indirectly affect the drill bit 114, which may include, but is not limited to, roller cone bits, PDC bits, natural diamond bits, any hole openers, reamers, coring bits, etc.

While not specifically illustrated herein, the disclosed treatment fluid composition may also directly or indirectly affect any transport or delivery equipment used to convey the treatment fluid composition to the drilling assembly 100 such as, for example, any transport vessels, conduits, pipelines, trucks, tubulars, and/or pipes used to fluidically move the treatment fluid composition from one location to another, any pumps, compressors, or motors used to drive the treatment fluid composition into motion, any valves or related joints used to regulate the pressure or flow rate of the treatment fluid composition, and any sensors (i.e., pressure and temperature), gauges, and/or combinations thereof, and the like.

The exemplary treatment fluid composition disclosed herein is a thermally-stable, solids-free self-degrading treatment fluid composition useful in fluid loss pill, kill pill, perforation pill and other gel treatment applications. Such a solids-free treatment fluid composition is considered as more effective in such applications due to the lower formation damage than treatment fluid compositions containing solid components.

The present treatment fluid is designed to undergo gellation in subterranean formations having a temperature of above about 200° F., particularly, from about 225° F. to about 320° F., and more particularly from 225° F. to 300° F. In these formations the treatment fluid composition will crosslink and form a stable gel. As a further advantage, gels formed from the treatment fluid compositions can be allowed to break at their native rate without using a breaker ("self-degrade"). In some embodiments, the native break rate of the gel can be changed by altering the composition of the gel formulation in the absence of a breaker, typically, by increasing or decreasing the gel stabilizer, as described below. Generally, the gels can self-degrade at a formation temperature above about 200° F. in about 12 hours to 5 days, can self-degrade at a formation temperature of from about 225° F. to about 320° F. in from 16 hours to 2 days, and can self-degrade at a formation temperature from 225° F. to 300° F. in from 1 day to 2 days. Thus, the gels resulting from the present treatment fluids are considered to be stable gels or thermally-stable and to be self-degrading in that they are stable for a period of at least hours before degrading and more typically are stable for at least 12 hours, at least 16 hours or at least 1 day.

The treatment fluid composition comprises an aqueous carrier fluid, a bipolymer having 2-acrylamido-2-methylpropanesulfonic acid monomer units and acrylamide monomer units ("amps-acrylamide bipolymer"), a crosslinking agent, and a stabilizer. In addition to the foregoing materials, it can also be desirable, in some embodiments, for other components to be present in the treatment fluid. Such additional components can include corrosion inhibitors, biocides, bactericides, friction reducers, gases, solubilizers, salts, scale inhibitors, corrosion inhibitors, foaming agents, anti-foaming agents, iron control agents, permeability modifiers and the like. It is preferable that such additives are chosen so as not to destroy the solids-free aspect of the treatment fluid composition. Accordingly, generally such additional components will not include particulate materials, fibrous materials, bridging agents, weighting agents, proppants, gravel and the like. In one embodiment, the treatment fluid is free or substantially free of particulate materials, fibrous materials, bridging agents, weighting agents, proppants, gravel and the like. In a further embodiment, the treatment fluid is substantially free of solids and can preferably have no solids; however, in some embodiments the treatment fluid can include solids of less than 2 cm in size, preferably any solids will be less than 0.5 cm in size and more preferably less than 0.05 cm in size. If the composition contains such solids it should contain less than 5 lb/bbl, preferably less than 2 lb/bbl and more preferably less than 0.5 lb/bbl.

The aqueous carrier fluid of the present embodiments can generally comprise fresh water, acidified water, salt water, seawater, brine, or an aqueous salt solution. In some embodiments, the aqueous carrier fluid can comprise monovalent brine or divalent brine. Suitable monovalent brines can include, for example, sodium chloride brines, sodium bromide brines, potassium chloride brines, potassium bromide brines, and the like. Suitable divalent brines can include, for example, magnesium chloride brines, calcium chloride brines, calcium bromide brines, and the like. In some embodiments, the aqueous carrier fluid can be a high density brine. As used herein, the term "high density brine" refers to a brine that has a density of about 10 lbs/gal or greater (1.2 g/cm3 or greater). It is believed that the formation of gels in such high density brines can be particularly problematic due to polymer hydration issues. However, treatment fluid compositions formed from high density brines can be particularly advantageous for kill pill and other fluid loss applications due to the significant hydrostatic pressure exerted by the weight of the gel. Presently, sodium bromide brine is preferred for use as the aqueous carrier fluid.

The treatment fluid composition utilizes gellable composition that form thermally stable gels in a subterranean formation and that can persist for extended periods of time at formation temperatures of from about 200° F. and, generally, up to about 320° F. Furthermore, the gellable composition within the treatment fluid composition forms a gel and preferably crosslinks at such temperatures. However, at ambient temperatures (e.g., 35° F. to 95° F.), it does not form a gel and is simply a fluid having a viscosity higher than the aqueous fluid carrier. The gellable composition may be capable of crosslinking at temperatures below 200° F. and forming a gel at such temperatures; however, the material does not gel in a short period (about 4 hour or less) of time after mixing even though it disperses into the aqueous fluid carrier. Preferably, the gellable composition can form a gel at temperatures of above about 200° F. and typically from about 225° F. to about 320° F., more typically from 225° F. to 300° F. within a period of less than 4 hours, typically less than 2 hours and more typically less than 1 hour. At this temperature range, the gellable composition is thermally or heat activated and crosslinks to form a crosslinked gel, which does not flow under in situ stress within the subterranean formation. The treatment fluid composition can be activated to form a complete gel or partial gel by heat activation as described above. At certain depths in the wellbore, this temperature is inherently present and, therefore, the treatment fluid composition will be heat activated to form a gel due to the temperatures in the wellbore at the various locations. The term "gel," in one or more embodiments, is meant to refer to a chemically crosslinked 3-dimensional elastic network of long-chain molecules with a certain amount of immobilized molecules.

Generally, the gellable composition can comprise a bipolymer, which comprises 2-acrylamido-2-methylpropanesulfonic acid and acrylamide monomer units ("amps-acrylamide bipolymer"), and a crosslinking agent, where the amps-acrylamide bipolymer and the crosslinking agent form a gel downhole and the gellation can be initiated or accelerated by the formation temperature. The crosslinking rate can be further accelerated or decelerated, as desired, by using gellation accelerators or retarders, respectively, such that the gel can be formed in a desired location within the subterranean formation. Since the treatment fluids can be introduced to the subterranean formation in an ungelled state, significant issues due to friction pressure are not typically encountered. Once in the subterranean formation, the gellable treatment fluids can form a crosslinked gel therein that does not flow under in situ stress after placement. As used herein, the term "in situ stress" refers to shearing forces present within a subterranean formation, including, for example, manmade shear produced during subterranean operations and naturally occurring shear forces present within the subterranean formation. The crosslinked gels of the current embodiments are to be distinguished from other uses of copolymers in subterranean operations, where a linear gel results from treatment with the crosslinking agent, but the gel remains sufficiently fluid that it does flow under low shear stress and is readily pumped downhole. As used herein, "gelled" will refer to the forming of a crosslinked gel that does not flow under in situ stress after placement or that is not readily pumpable.

In some embodiments, formation of a crosslinked gel can be promoted by using higher concentrations of a crosslinking agent than have typically been employed with readily pumpable copolymers. In some embodiments, the bipolymer can become fully crosslinked in the presence of a crosslinking agent. As used herein, the terms "full crosslinking," "complete crosslinking," and grammatical equivalents thereof will refer to an amount of crosslinking that achieves a viscosity that cannot be substantially further increased by increasing the amount of crosslinking agent.

The gels formed using the amps-acrylamide bipolymer can have sufficiently high thermal stabilities over extended periods of time to be suitable for subterranean operations in which it is desirable to at least partially block the flow of fluids in the subterranean formation for a period of at least about 12 hours up to about 5 days and typically for from 16 hours to 3 days, more typically from 1 day to 2 days at elevated formation temperatures in the range of above about 200° F. and typically from about 225° F. to about 320° F., more typically from 225° F. to 300°. The extended thermal stability of the gels allows the present treatment fluids to be used as kill pills and perforation pills for impeding the flow of fluids, particularly formation fluids, within a subterranean formation. In addition, the present treatment fluids can be used for fluid loss control applications for similar reasons. In some embodiments, the present treatment fluids can likewise be used in workover fluid applications.

As used herein, the term "bipolymer" refers to copolymers that are obtained by the copolymerization of essentially only two monomer species. The amps-acrylamide bipolymer used in the present embodiments are obtained by the copolymerization of 2-acrylamido-2-methylpropanesulfonic acid monomer units and acrylamide monomer units. In order to achieve the thermally-stable, solids-free self-degrading treatment fluid composition, the copolymerization should be such that the chain length and the 2-acrylamido-2-methylpropanesulfonic acid monomer unit to acrylamide monomer unit ratio result in a bipolymer having a molecular weight from 7 million to 9 million and, preferably, a molecular weight of about 8 million. One such suitable bipolymer is sold by BASF under the designation FDP-C1055-12.

While not wishing to be bound by theory, the molecular weight of a polymer is important because it determines many physical properties; such as, temperatures of transitions and mechanical properties (stiffness, strength, viscosity, viscoelasticity, and toughness). Unlike small molecules, the molecular weight of a polymer is not one unique value but, rather, a given polymer will have a distribution of molecular weights. The distribution will depend on the way the polymer is produced. Thus, the molecular weight as used herein refers to a distribution of molecular weight or average molecular weight or average molecular mass. Amps-acrylamide bipolymers having molecular weights from 7 million to 9 million or about 8 million are believed to have the necessary physical properties to produce the thermally-stable, solids-free self-degrading treatment fluid, which can at least partially block the flow of fluids in the subterranean formation for a period of at least about 12 hours up to about 5 days and typically for from 16 hours to 3 days, more typically from 1 day to 2 days at elevated formation temperatures in the range of above about 200° F. and typically from about 225° F. to about 320° F., more typically from 225° F. to 300°. One suitable amps-acrylamide biopolymer is sold under the designation FDP-C1055-12 by BASF and has a molecular weight of 8 million.

In various embodiments, an amount of the bipolymer in the present treatment fluids can range from about 0.1 wt. % to about 10 wt. % relative to the water of the treatment fluid. In some embodiments, an amount of the bipolymer can range from 0.9 wt. % to 5 wt. % relative to the water of the treatment fluid. In some embodiments, an amount of the bipolymer can range from 1.1 wt. % to 1.6 wt. % relative to the water of the treatment fluid.

A variety of crosslinking agents can be used in accordance with the present embodiments. In some embodiments, the crosslinking agent can be a metal ion. Metal ions suitable to serve as crosslinking agents in the present embodiments can include, for example, titanium (IV) ions, zirconium (IV) ions, chromium (III) ions, cobalt (III) ions, aluminum (III) ions, hafnium (III) ions, and the like. In some embodiments, zirconium derived crosslinking agents are preferred, such as crosslinking agents comprised of zirconyl chloride or zirconyl sulfate. One exemplary zirconium crosslinking agent is sold under the trademark CFS-592 by Halliburton Energy Services, Inc. In some embodiments, a metal ion-releasing compound such as a coordination compound can be used. In some embodiments, the crosslinking agent can be an organic crosslinking agent such as, for example, a diamine, dithiol or a diol. In some embodiments, the crosslinking agent can be an organic polymer such as, for example, a polyester, a polyalkyleneimine (e.g., polyethyleneimine) or a polyalkylenepolyamine. Having the benefit of the present disclosure and knowing the temperature and chemistry of a subterranean formation of interest, one having ordinary skill in the art will be able to choose a crosslinking agent and amount thereof suitable for producing a desired gel time and viscosity.

In some embodiments, mixtures of crosslinking agents can be used to achieve a desired rate of crosslinking. For example, in some embodiments, a crosslinking agent that produces a slower rate of crosslinking can be added as a gellation retarder, and in other embodiments, a crosslinking agent that produces a faster rate of crosslinking can be added as a gellation accelerator. In some embodiments, a gellation retarder or a gellation accelerator can, respectively, increase or decrease the temperature at which gellation takes place. In some embodiments, a metal ion-containing crosslinking agent can contain various concentrations of acetate and lactate, which will determine whether the added crosslinking agent serves as a gellation retarder or a gellation accelerator. Appropriate amounts of acetate and lactate ions to be added to a metal ion-containing crosslinking agent to serve as either a gellation retarder or gellation accelerator can be determined through routine experimentation by one having ordinary skill in the art. Other agents that can be added to control the rate and/or temperature of gellation can include, for example, other α-hydroxy acids (e.g., glycolic acid, tartaric acid and the like), diols and polyols.

Generally, the crosslinking agent is present in the treatment fluid composition in an amount sufficient to provide a desired degree of crosslinking of the bipolymer. In some embodiments, the amount of crosslinking agent present can be sufficient to achieve complete crosslinking, although incomplete crosslinking may be more preferable in other embodiments. In some embodiments, an amount of the crosslinking agent in the treatment fluid can be at least about 5 wt. % relative to the water in the treatment fluid composition. In other embodiments, an amount of the crosslinking agent can be at least 2 wt. % relative to the water in the treatment fluid composition. In still other embodiments, an amount of the crosslinking agent in the treatment fluid can be at least 1.10 wt. % relative to the water in the treatment fluid composition. In some embodiments, an amount of the crosslinking agent can range from about 0.1 wt. % to about 2 wt. % relative to the water in the treatment fluid composition or from 0.25 wt. % to 0.75 wt. % relative to the water in the treatment fluid composition.

In order to form a gel having a suitable temperature stability and viscosity profile, an amount of the bipolymer to the crosslinking agent is typically maintained at a concentration ratio of at most about 10:1. In some embodiments, an amount of the bipolymer to the crosslinking agent can be maintained at a concentration ratio of at most 6:1. In one embodiment the concentration ratio of bipolymer to crosslinking agent can be about 3:1 but in some embodiments, a concentration ratio of the bipolymer to the crosslinking agent can range from 6:1 to 2:1. In other embodiments, a concentration ratio of the bipolymer to the crosslinking agent can range from about 6:1 to about 1:1.

Treatment fluid compositions described herein comprise a gel stabilizer such as one or more antioxidants. When the formation temperature is high and/or when the gel formed from the treatment fluid is allowed to remain in the subterranean formation for extended periods of time, it can be especially beneficial to include one or more gel stabilizers in the treatment fluid to maintain the rheological and chemical stability of the gel. Without being bound by any theory or mechanism, it is believed that inclusion of a gel stabilizer, especially antioxidants, in the treatment fluids can limit oxidative damage to the bipolymer that can otherwise occur over extended periods of time at high temperatures. Oxidative damage can include polymer chain scission, for example, which can reduce the ability of the bipolymer to form a gel. In some cases, extended exposure to high temperatures can be damaging to the antioxidant itself, which can limit its ability to protect the bipolymer from oxidative damage.

In some embodiments, other beneficial effects of including a gel stabilizer can be realized as well. For example, in some embodiments, the degree of crosslinking can be altered by including or excluding certain gel stabilizers. If the degree of crosslinking is altered by the inclusion or exclusion of an antioxidant, the ratio of the bipolymer to the crosslinking agent can be adjusted, if desired, to achieve a desired degree of crosslinking in the gel.

In some embodiments, suitable gel stabilizers can include, for example, a hydroquinone, a sulfite salt (e.g., sodium sulfite), ascorbic acid and any salt or any derivative thereof, erythorbic acid and any salt or any derivative thereof (e.g. sodium erythorbate), or any combination thereof. Other suitable gel stabilizers can be envisioned by one having ordinary skill in the art. For example, in some embodiments, other suitable gel stabilizers can include, for example, tannic acid, gallic acid, propyl gallate, thiols, and the like. In some embodiments, certain antioxidants can themselves be degraded by extended residence times in high temperature subterranean formations. In some embodiments, a gel stabilizer containing ascorbic acid, erythorbic acid, any salt thereof, any derivative thereof, or any combination thereof can be further combined with an alkylhydroxylamine to further increase its temperature stability. In some embodiments, a suitable alkylhydroxylamine compound for use in high temperature subterranean formations can be isopropylhydroxylamine. It is to be recognized that other alkylhydroxylamine compounds can also be used in place of isopropylhydroxylamine, if desired. Examples include, without limitation, isopropylhydroxylamine, diethylhydroxylamine, tert-butylhydroxylamine, phenylhydroxylamine, cyclohexylhydroxylamine, and benzylhydroxylamine. Generally, it is contemplated that any alkylhydroxylamine compound having a molecular weight of less than about 400 can be used in the present embodiments. When used, a ratio of the alkylhydroxylamine compound to the ascorbic acid and/or erythorbic acid, or salt or derivative thereof, can range from about 1:1 to about 3:1. In some embodiments, the alkylhydroxylamine compound and the ascorbic acid and/or erythorbic acid, or salt or derivative thereof, can be blended in an aqueous fluid.

In an exemplary embodiment, the gel stabilizer will be a combination of a non-sulfite stabilizer and a sulfite stabilizer. In a further exemplary embodiment, the gel stabilizer will be a combination of three or more stabilizers comprising at least a first stabilizer selected from the group consisting of ascorbic acid, erythorbic acid, any salt thereof, and any derivative thereof; a second stabilizer that is selected from the group consisting of alkylhydroxylamines; and a third stabilizer selected from the group consisting of sulfite salts. In yet a further exemplary embodiment the gel stabilizer consists essentially of a first stabilizer selected from the group consisting of ascorbic acid, erythorbic acid, any salt thereof, any derivative thereof and combinations thereof; a second stabilizer that is selected from the group consisting of alkylhydroxylamines and combinations thereof; and a third stabilizer selected from the group consisting of sulfite salts and combinations thereof the treatment fluid can have no other gel stabilizers present. The gel stabilizer can comprise erythorbate, an alkylhydroxylamine and sodium sulfite. The gel stabilizer can consist essentially of one or more erythorbates, one or more alkylhydroxylamines and sodium sulfite and the treatment fluid can have no other gel stabilizers present.

The amount of non-sulfite stabilizer to sulfite stabilizer will generally be in the range of from about 1:1 to about 3:1 and can be from 1.5:1 to 2.5:1 or about 2:1. The total amount of stabilizer used in the treatment fluid will depend on the subterranean formation temperature and length of gellation desired and can be readily determined by one skilled in the art based on this disclosure. Generally, the total amount of gel stabilizer will be at least about 0.25 wt. % relative to the water in the treatment fluid and can be at least 1 wt. %. In some embodiments, the total amount of gel stabilizer will be from about 0.1 wt. % to about 10 wt. % or from 0.2 wt. % to 5 wt. %.

In some embodiments, the present treatment fluids can have a pH ranging from about 1 to about 5 prior to gel formation occurring. In other embodiments, the treatment fluids can have a pH ranging from about 3 to about 5. In still other embodiments, the treatment fluids can have a pH ranging from 2 to 4.8 or from 4.2 to 4.8. In some embodiments, the present treatment fluids can further comprise a buffer to maintain the pH of the treatment fluid within a desired range, including within any of the above ranges. When used, the buffer should be chosen such that it does not interfere with the formation of a gel within the subterranean formation. In various embodiments, a concentration of the buffer can range between about 0.1 wt. % and about 1 wt. % of the treatment fluid. In some embodiments, the pH of the treatment fluid can be further adjusted with a pH-modifying agent such as, for example, an acid or a base. Reasons why one would want to adjust the pH of the treatment fluid can include, for example, to adjust the rate of hydration of the bipolymer, to activate the crosslinking agent, to improve the properties of the gel formed from the bipolymer, to adjust the rate of gellation of the bipolymer, and any combination thereof. In addition, the pH of the treatment fluid can influence the rate at which breakers, particularly delayed-release breakers, are operable to break the gel formed from the bipolymer.

The treatment fluids disclosed herein are especially useful in formations having a temperature of about 200° F. or greater, the present treatment fluids can undergo gellation simply by exposure to the formation temperatures. In subterranean formations having a temperature of about 200° F. to about 320° F. and more typically from 225° F. to 300° and especially 225° F. to about 275°, the treatment fluids can undergo gellation to a gel that is thermally stable at the formation temperature. That is, that will remain in a gelled state at the subterranean formation temperatures for at least 12 hours up to about 5 days and typically for from 16 hours to 3 days, more typically from 1 day to 2 days. The period of stability can be adjusted downward by decreasing the amounts of gel stabilizer in the treatment fluid and can be adjusted upward by increasing the amount of gel stabilizer in the treatment fluid.

The present methods can comprise breaking the gel in the subterranean formation, most typically after the gel has been in the subterranean formation for at least about 12 hours. In most embodiments, the treatment fluid can be formulated such that the gel breaks or self-degrades at the formation temperature at a desired time. That is, in such embodiments, the gel can be broken without adding a breaker or including a breaker in the treatment fluid. Typically, the gelled treatment fluid will self-degrade in a subterranean formation having a temperature above about 200° F. in a period of from 12 hours to 5 days, depending on the amount of gel stabilizer comprising the gelled treatment fluid. Typically, the gelled treatment fluid can self-degrade at a formation temperature from about 225° F. to about 320° F. in a period of from 16 hours to 2 days. More typically, the gelled treatment fluid will be formulated with sufficient gel stabilizer such that it will self-degrade in a subterranean formation having a temperature from 225° F. to 300° F. in a period of from 1 day to 2 days.

In other embodiments, the present methods can further comprise treating the gel with a gel breaker; however, an advantage of the present treatment fluid is that it does not typically need a gel breaker. In some embodiments, the breaker can be added to the gel within a separate treatment fluid. A wide variety of suitable breakers are well known to one having ordinary skill in the art. In some embodiments, the breaker can be an oxidizer such as, for example, sodium bromate, sodium chlorate, ammonium persulfate or manganese dioxide. In some embodiments, the breaker can comprise a treatment fluid having a pH of about 7 or greater, which can cause gels formed from the present treatment fluids to collapse. In some embodiments, the breaker can be present in the treatment fluid as a delayed-release breaker. In some embodiments, a breaker can be formulated for delayed release by encapsulating the breaker in a material that is slowly soluble or slowly degradable in the treatment fluid or the gel formed therefrom. Illustrative materials that can be used for encapsulation can include, for example, porous materials (e.g., precipitated silica, alumina, zeolites, clays, hydrotalcites, and the like), EPDM rubber, polyvinylidene chloride, polyamides, polyurethanes, crosslinked and partially hydrolyzed acrylate polymers, and the like. In some embodiments, degradable polymers can be used to encapsulate a breaker. In some embodiments, a suitable breaker for use with the present treatment fluids can be "VICON FB" or HT Breaker," which are breakers available from Halliburton Energy Services, Inc.

Embodiments using a gel breaker can be advantageous where the temperature of the subterranean formation is less than 200° F. or if a self-degrading period of less than 12 hours is desired. Knowing the temperature and chemistry of the subterranean formation, one having ordinary skill in the art and the benefit of the present disclosure will be able to formulate a treatment fluid having a desired break time.

The treatment fluids can be formed by a process comprising the steps of:
  adding an amps-acrylamide bipolymer to an aqueous carrier fluid while mixing to produce a first mixture;
  adjusting the pH of the first mixture to from 2 to 4 to produce a pH adjusted mixture;
  mixing in a crosslinking agent to the pH adjusted mixture to produce a second mixture;
  mixing in a gel stabilizer; and
  adjusting the pH of the resulting mixture to between 1 and 5 pH, as needed.

More specifically, an exemplary process might comprise placing a sodium bromide brine into an appropriately sized container and mixing under shear conditions. The amps-acrylamide bipolymer can then be added to the brine while it is shearing and the stifling continues until the bipolymer is well dispersed in the brine. Subsequently, the pH of the mixture can be adjusted to from 2.5 to 3.0 by the addition of an appropriate acid, such as sulfamic acid, followed by the crosslinking agent being quickly added to the pH adjusted polymer mixture while stifling until fully dispersed. Next, the gel stabilizer is added to the mixture while stirring. Once the gel stabilizer is fully dispersed, the pH of the thus fully formulated pill is adjusted so that it is from 1 to 5. Different pH values for the formulation can be used depending on the required holding time for the treatment fluid composition with lower pH increasing breaking time. The pH can be adjusted by adding a suitable acid, such as sulfamic acid.

To facilitate a better understanding, the following example of an embodiment is given. In no way should the following example be read to limit, or to define, the scope of the invention.

EXAMPLES

This example illustrates the production of a treatment fluid in accordance with one embodiment. A kill pill was formulated by first diluting 280 mL of 12.5 lb/gal NaBr stock brine with 420 mL of 8.345 lb/gal deionized water to produce a 10 lb/gal NaBr brine. The diluted brine was placed in an appropriately sized container and sheared at moderate speed with a paddle mixer. The rotational speed of the mixer was adjusted such that it creates a deep vortex without whipping air into the fluid.

Next, 5 lb/bbl of an amps-acrylamide polymer was slowly added to the brine while shearing. The amps-acrylamide polymer used is sold under the designation FDP-C1055-12 by BASF and had a molecular weight of about 8 million. The mixture was stirred until the majority of the areas of high polymer concentration had been dispersed. Then the pH of the polymer solution was adjusted down to about 3 by addition of an aqueous sulfamic acid. Quickly after the pH adjustment, 2 lb/bbl of a zirconium-derived crosslinking agent was added to the polymer solution with stirring. The viscosity of the fluid increased rapidly; accordingly, the rotation speed of the mixer was adjusted as needed to discourage the solution from climbing the mixing shaft.

Once the crosslinking agent was fully dispersed, 1 lb/bbl of a gel stabilizer, comprising a blend of erythorbate and alkylhydroxylamine and sold under the trademark CFS-563 by Halliburton Energy Services, Inc., was added with gentle stirring. Afterwards, 1 lb/bbl of a sodium sulfite gel stabilizer sold under the trademark Barascav D by Halliburton Energy Services, Inc. was added. After ensuring that the gel stabilizers were fully dispersed, the pH of the fully formulated pill was adjusted to be in the range of from 4.2 to 4.8. The pH was adjusted by adding sulfamic acid as necessary.

The resulting fully formulated treatment fluid was poured into a glass bottle. The treatment fluid was a thick liquid at this point. The bottle containing the treatment fluid was put in an aging cell and pressurized to 500 psi and then heated in an oven at 300° F. for 2 hours. After this aging process, the treatment fluid had formed into a stable gel that did not readily flow.

In accordance with the above description, various embodiments of the invention will now be further described. One embodiment provides for a treatment fluid for a subterranean formation comprising an aqueous carrier fluid, a crosslinking agent, an amps-acrylamide bipolymer and a gel stabilizer.

In a further embodiment the gel stabilizer can comprise at least one non-sulfite stabilizer and at least one sulfite stabilizer. Particularly, the gel stabilizer can comprise a first stabilizer selected from the group consisting of ascorbic acid, erythorbic acid, any salt thereof, any derivative thereof and combinations thereof, a second stabilizer selected from the group consisting of alkylhydroxylamines and combinations thereof, and a third stabilizer selected from the group consisting of sulfite salts and combinations thereof. Alternatively, the gel stabilizer can comprise a first stabilizer selected from the group consisting of erythorbates, a second stabilizer selected from the group consisting of alkylhydroxylamines, and a third stabilizer selected from the group consisting of sulfite salts. More particularly, the gel stabilizer can consist essentially of one or more erythorbates, one or more alkylhydroxylamines and sodium sulfite with the treatment fluid having no other gel stabilizers.

In a further embodiment, the amps-acrylamide bipolymer is obtained by copolymerization of 2-acrylamido-2-methylpropanesulfonic acid monomer units and acrylamide monomer units wherein the amps-acrylamide bipolymer has a molecular weight from 7 million to 9 million. Alternatively, the amps-acrylamide biopolymer can have a molecular weight of about 8 million. In a further embodiment the amps-acrylamide bipolymer consists essentially of 2-acrylamido-2-methylpropanesulfonic acid monomer units and acrylamide monomer units.

The above treatment fluids can have a composition that undergoes gellation at a formation temperature from about 225° F. to about 320° F. with the resulting gelled treatment fluid self-degrading at the formation temperature of from about 225° F. to about 320° F. in about 16 hours to 2 days. Alternatively, the treatment fluid can have a composition that undergoes gellation at a formation temperature from about 225° F. to about 300° F. with the resulting gelled treatment fluid self-degrading at the formation temperature of from 225° F. to 300° F. in from 1 day to 2 days.

In another embodiment in accordance with the above description, there is provided a process for formulating a kill pill for a subterranean formation. The process comprises
(a) adding an amps-acrylamide bipolymer to an aqueous carrier fluid while mixing to produce a first mixture, wherein the amps-acrylamide bipolymer consists essentially of 2-acrylamido-2-methylpropanesulfonic acid and acrylamide monomer units;
(b) adjusting the pH of the first mixture to from 2 to 4 to produce a pH adjusted mixture;
(c) mixing in a crosslinking agent to the pH adjusted mixture to produce a second mixture; and
(d) mixing into the second mixture a gel stabilizer.

The process can further comprise adjusting the pH of the second mixture after step (d) so that the pH of the thus fully formulated pill is from 1 to 5. Additionally, the gel stabilizer of the process can comprise a first stabilizer selected from the group consisting of ascorbic acid, erythorbic acid, any salt thereof, any derivative thereof and combinations thereof, a second stabilizer selected from the group consisting of alkylhydroxylamines and combinations thereof, and a third stabilizer selected from the group consisting of sulfite salts. Alternatively, the gel stabilizer can consist essentially of one or more erythorbates, one or more alkylhydroxylamines and sodium sulfite and the treatment fluid has no other stabilizers.

The amps-acrylamide biopolymer can be obtained by copolymerization of 2-acrylamido-2-methylpropanesulfonic acid and acrylamide monomer units wherein the amps-acrylamide bipolymer has a molecular weight from 7 million to 9 million.

In yet another embodiment in accordance with the above description, there is provided a method of treating a subterranean formation, the method comprising:
(a) providing a treatment fluid comprising an aqueous carrier fluid, a crosslinking agent, an amps-acrylamide bipolymer, and a gel stabilizer, wherein the amps-acrylamide bipolymer consists essentially of 2-acrylamido-2-methylpropanesulfonic acid and acrylamide monomer units;
(b) introducing the treatment fluid into a subterranean formation;
(c) allowing the treatment fluid to form a gel in the subterranean formation; and
(d) breaking the gel after it has been in the subterranean formation for at least about one day.

The gel stabilizer of the method can comprise a first stabilizer selected from the group consisting of ascorbic acid, erythorbic acid, any salt thereof, any derivative thereof and combinations thereof, a second stabilizer selected from the group consisting of alkylhydroxylamines and combinations thereof, and a third stabilizer selected from the group consisting of sulfite salts and combinations thereof. Alternatively, the gel stabilizer can consist essentially of one or more erythorbates, one or more alkylhydroxylamines and sodium sulfite and the treatment fluid has no other gel stabilizers.

The amps-acrylamide bipolymer of the method can be obtained by copolymerization of 2-acrylamido-2-methylpropanesulfonic acid and acrylamide monomer units wherein the amps-acrylamide bipolymer has a molecular weight from 7 million to 9 million. Further, the treatment fluid of the method can have a composition that undergoes gellation at a formation temperature from about 200° F. to 320° F. with the resulting gelled treatment fluid self-degrading at the formation temperature of from 225° F. to about 320° F. in about 16 hours to 2 days. Alternatively, the treatment fluid can have a composition that undergoes gellation at a formation temperature from about 225° F. to about 300° F. with the resulting gelled treatment fluid self-degrading at the formation temperature of from 225° F. to 300° F. in from 1 day to 2 days.

While various embodiments have been shown and described herein, modifications may be made by one skilled in the art without departing from the spirit and the teachings herein. The embodiments described herein are exemplary only, and are not intended to be limiting. Many variations, combinations, and modifications are possible. Accordingly, the scope of protection is not limited by the description set out above, but is defined by the claims which follow, that scope including all equivalents of the subject matter of the claims.

What is claimed is:
1. A treatment fluid for a subterranean formation comprising:
an aqueous carrier fluid;
a crosslinking agent;
an amps-acrylamide bipolymer; and
a gel stabilizer comprising a first stabilizer selected from the group consisting of ascorbic acid, erythorbic acid, any salt thereof, any derivative thereof and combinations thereof, a second stabilizer selected from the group consisting of alkylhydroxylamines and combinations thereof, and a third stabilizer selected from the group consisting of sulfite salts and combinations thereof.
2. The treatment fluid of claim 1 wherein said gel stabilizer consists essentially of one or more erythorbates, one or more alkylhydroxylamines and sodium sulfite and said treatment fluid has no other gel stabilizers.
3. The treatment fluid of claim 1 wherein said amps-acrylamide bipolymer is obtained by copolymerization of 2-acrylamido-2-methylpropanesulfonic acid monomer units and acrylamide monomer units wherein said amps-acrylamide bipolymer has a molecular weight from 7 million to 9 million.

4. The treatment fluid of claim 3 wherein said amps-acrylamide bipolymer has a molecular weight of about 8 million.

5. The treatment fluid of claim 3 wherein said treatment fluid has a composition that undergoes gellation at a formation temperature from about 225° F. to about 320° F. with the resulting gelled treatment fluid self-degrading at said formation temperature of from about 225° F. to about 320° F. in about 16 hours to 2 days.

6. The treatment fluid of claim 3 wherein said treatment fluid has a composition that undergoes gellation at a formation temperature from about 225° F. to about 300° F. with the resulting gelled treatment fluid self-degrading at said formation temperature of from 225° F. to 300° F. in from 1 day to 2 days.

7. The treatment fluid of claim 3 wherein said amps-acrylamide bipolymer consists essentially of 2-acrylamido-2-methylpropanesulfonic acid monomer units and acrylamide monomer units.

8. The treatment fluid of claim 7 wherein said gel stabilizer consists essentially of one or more erythorbates, one or more alkylhydroxylamines and sodium sulfite and said treatment fluid has no other gel stabilizers.

9. The treatment fluid of claim 7 wherein said treatment fluid has a composition that undergoes gellation at a formation temperature from about 225° F. to about 300° F. with the resulting gelled treatment fluid self degrading at said formation temperature of from about 225° F. to about 300° F. in from 1 day to 2 days.

10. A process for formulating a kill pill for a subterranean formation, said process comprising:
adding an amps-acrylamide bipolymer to an aqueous carrier fluid while mixing to produce a first mixture, wherein said amps-acrylamide bipolymer consists essentially of 2-acrylamido-2-methylpropanesulfonic acid and acrylamide monomer units;
adjusting the pH of said first mixture to from 2 to 4 to produce a pH adjusted mixture;
mixing in a crosslinking agent to said pH adjusted mixture to produce a second mixture; and
mixing into said second mixture a gel stabilizer comprising a first stabilizer selected from the group consisting of ascorbic acid, erythorbic acid, any salt thereof, any derivative thereof and combinations thereof, a second stabilizer selected from the group consisting of alkylhydroxylamines and combinations thereof, and a third stabilizer selected from the group consisting of sulfite salts and combinations thereof.

11. The process of claim 10 wherein said gel stabilizer consists essentially of one or more erythorbates, one or more alkylhydroxylamines and sodium sulfite and said treatment fluid has no other stabilizers.

12. The process of claim 10 wherein said amps-acrylamide bipolymer is obtained by copolymerization of 2-acrylamido-2-methylpropanesulfonic acid and acrylamide monomer units wherein said amps-acrylamide bipolymer has a molecular weight from 7 million to 9 million.

13. A method of treating a subterranean formation, said method comprising:
providing a treatment fluid comprising an aqueous carrier fluid, a crosslinking agent, an amps-acrylamide bipolymer, and a gel stabilizer, wherein said amps-acrylamide bipolymer consists essentially of 2-acrylamido-2-methylpropanesulfonic acid and acrylamide monomer units, and wherein said gel stabilizer comprises a first stabilizer selected from the group consisting of ascorbic acid, erythorbic acid, any salt thereof, any derivative thereof and combinations thereof, a second stabilizer selected from the group consisting of alkylhydroxylamines and combinations thereof, and a third stabilizer selected from the group consisting of sulfite salts and combinations thereof;
introducing said treatment fluid into a subterranean formation;
allowing said treatment fluid to form a gel in said subterranean formation; and
breaking said gel after it has been in said subterranean formation for at least about one day.

14. The method of claim 13 wherein said gel stabilizer consists essentially of one or more erythorbates, one or more alkylhydroxylamines and sodium sulfite and said treatment fluid has no other gel stabilizers.

15. The method of claim 13 wherein said amps-acrylamide bipolymer is obtained by copolymerization of 2-acrylamido-2-methylpropanesulfonic acid and acrylamide monomer units wherein said amps-acrylamide bipolymer has a molecular weight from 7 million to 9 million.

16. The method of claim 15 wherein said treatment fluid has a composition that undergoes gellation at a formation temperature from about 225° F. to 320° F. with the resulting gelled treatment fluid self-degrading at said formation temperature of from 225° F. to about 320° F. in about 16 hours to 2 days.

* * * * *